United States Patent [19]

Urushibata et al.

[11] Patent Number: 5,120,397
[45] Date of Patent: Jun. 9, 1992

[54] DEINKING AGENT

[75] Inventors: Hideaki Urushibata; Koji Hamaguchi; Hiroyoshi Hiramatsu; Yoshitaka Miyauchi, all of Wakayama, Japan

[73] Assignee: Kao Corporation, Tokyo, Japan

[21] Appl. No.: 515,612

[22] Filed: Apr. 27, 1990

[30] Foreign Application Priority Data

Apr. 28, 1989 [JP] Japan ................................. 1-111321

[51] Int. Cl.⁵ ............................................... D21C 5/02
[52] U.S. Cl. ........................................... 162/5; 162/4; 252/162; 252/174.21; 252/174.22
[58] Field of Search .............. 252/162, 174.21, 174.22; 162/5, 9, 4

[56] References Cited

FOREIGN PATENT DOCUMENTS 239585 11/1985 Japan .

Primary Examiner—Prince Willis, Jr.
Assistant Examiner—John F. McNally
Attorney, Agent, or Firm—Birch, Stewart, Kolasch & Birch

[57] ABSTRACT

A deinking composition comprising a deinking agent which is a reaction product obtained by:
(a) reacting (i) a natural oil or a fat or a reaction product of a natural oil or a fat with glycerine, with (ii) a hexahydric alcohol, wherein the molar ratio of said hexahydric alcohol and glycerine moiety in said natural oil and fat is in the range of between 0.05/1–0.48/1, to obtain an ester mixture having a hydroxyl group value (OHV) of 18–220; and
(b) reacting said ester mixture with ethylene oxide and propylene oxide wherein the molar ratio of ethylene oxide to propylene oxide is in the range of between 1.8 and 2.2, and the average mole number of added ethylene oxide is in the range of between 30 and 300, based on the mole number of glycerides present.

5 Claims, No Drawings

DEINKING AGENT

The present invention relates to a deinking agent which is used for the reclamation of waste paper such as newspapers and magazines. More particularly, the present invention relates to a deinking agent which yields deinked pulp having a higher b value and containing lesser of an amount of sticky substances when used for deinking treatments by the floatation method, washing method, or a method which utilizes portions from both aforementioned methods.

PRIOR ART

The reclamation of waste paper such as newspapers and magazines is an old practice. Importance is being attached to the effective reclamation of waste paper because of the recent supply shortage and price hike of pulp sources. In addition, deinked pulp is finding more valuable uses than before. On the other hand, the reclamation of waste paper is becoming difficult from the standpoint of deinking on account of the recent changes in printing technology, printing methods, and printing inks, and the utilization of waste paper which has never been reclaimed in the past. For more effective deinking, improvements are being made on existing machines.

A variety of chemicals have been used to separate and remove ink and other impurities from waste paper. They include alkali agents such as sodium hydroxide, sodium silicate, sodium carbonate, and sodium phosphate; bleaching agents such as hydrogen peroxide, hyposulfite, hypochlorite; and sequestering agents such as EDTA and DTPA, and a deinking agent. Examples of deinking agents include anionic surface active agents such as alkybenzenesulfonates, higher alcohol sulfate ester salts, α-olefinsulfonates, and dialkylsulfosuccinates; and nonionic surface active agents such as an ethylene oxide adduct of a higher alcohol, an alkylphenol or a fatty acid and an alkanolamide. They may be used either by themselves or in combination with one another.

Unfortunately, the conventional deinking agents are poor in ink catching performance, although they are good in foaming performance when used during the floatation process. Also, when they are used in the washing method, they are poor in detergency and generate a large amount of foam which causes trouble during draining. Thus, with the conventional deinking agents, it was only possible to obtain deinked pulp of a low grade.

Moreover, deinked pulp obtained by using conventional deinking agents is limited in its areas of application since it looks dark and dull and yet has a high degree of whiteness. Deinked pulp can be used only in reduced amounts in paper board and newsprint paper. To eliminate the dull appearance, it is necessary to increase the amount of bleaching agent. One way of producing deinked pulp having a bright color tone is to increase the b value. It is possible to increase the b value if an alkaline agent is used in large quantities. However, this causes an increase in sticky substances and waste discharge load and makes the resulting pulp brittle. There have been no effective means to eliminate these disadvantages.

The present inventors proposed using, as a deinking agent, a reaction product obtained by adding an alkylene oxide to a mixture composed of a natural fat or oil and a tri- or polyhydric alcohol. See Japanese Patent Laid-open No. 239585/1985.

After careful examination on its behavior in the deinking process, it was found that this deinking agent causes foaming troubles in the floatation step, dehydration step, draining step, and papermaking step, if it is composed of a natural fat or oil and a tri- or polyhydric alcohol in a molar ratio of 1:0.5 to 1:3. Moreover, it has the disadvantage in that it does not eliminate the dull appearance completely, although it provides deinked pulp having a high degree of whiteness.

SUMMARY OF THE INVENTION

The present inventors have carried out research on the development of a deinking agent which will exhibit the outstanding ink removing performance without foaming trouble in the floatation method or the washing method or a compromise method thereof, and which will provide for a deinked pulp having a high b value, without a dull appearance, and containing a lesser of an amount of sticky substances. It was unexpectedly found that the above-mentioned requirements can be met when the deinking agent contains a specific nonionic surface active agent. This finding has led to the present invention.

Accordingly, the present invention relates to a deinking composition which comprises a deinking agent which is a reaction product obtained by following the reaction steps:

(a) reacting (i) a natural oil or a fat or a reaction product of a natural oil and a fat with glycerin, with (ii) a hexahydric alcohol, wherein the molar ratio of said hexahydric alcohol and glycerin moiety in said natural oil and fat is in the range of between 0.05/1–0.48/1, to obtain an ester mixture having a hydroxyl group value (OHV) of 18–220; and (b) reacting said ester mixture with ethylene oxide and propylene oxide wherein the molar ratio of ethylene oxide to propylene oxide is in the range of between 1.8 and 2.2, and the average mole number of added ethylene oxide is in the range of between 30 and 300, based on the mole number of glycerides present.

The hexahydric alcohol that can be used in the present invention includes galactitol, talitol, mannitol, sorbitol and tetraglycerin.

The fat and oil that can be used in the present invention include vegetable oils such as coconut oil, palm oil, olive oil, soybean oil, rapeseed oil, linseed oil, castor oil, and sunflower oil; land animal fats and oils such as lard, beef tallow, and bone oil; aquatic animal fats and oils such as sardine oil and herring oil; hardened oils and semihardened oils thereof, and recovered oils obtained in the purification step for these fats and oils.

Monoglycerides or diglycerides which are prepared by reacting the natural fat and oil mentioned above with glycerin, can be also used.

In the present invention, the molar ratio of the hexahydric alcohol and glycerin moiety in the natural fat or oil is in the range of 0.05/1–0.48/1, and the hydroxyl group value (OHV) of the ester mixture of 18 to 220, are important.

In calculating the molar ratio described above of the hexahydric alcohol and glycerin, glycerin in the natural fat or oil means the amount of glycerin which combines with fatty acid to constitute a natural fat or oil and the amount of glycerin which is used to react with the fat or oil in order to modify the fat or oil.

The compound which meets the above requirement with regard to molar ratio and hydroxyl group value is effective in removing fine ink particles and yields a deinked pulp which has a bright color tone, which is free of a dull appearance and hence has a high b value. If this requirement is not met, the dull appearance will not be completely eliminated from deinked pulp.

According to the present invention, the addition of ethylene oxide and propylene oxide may be accomplished simultaneously (by random addition) or sequentially (by block addition), with the former being preferable from the standpoint of decreasing foaming problems.

According to the present invention, the addition of ethylene oxide and propylene oxide should be carried out in a molar ratio of 1.8 to 2.2, and the amount of ethylene oxide added should be 30 to 300 mol based on the mole number of glycerides present. If this requirement is not met, the resulting deinking agent is poor in its ability to remove ink from waste paper and also poor in foaming performance during floatation treatment or in ink removing performance during washing treatment. The compound of the present invention which meets this requirement is effective in reducing sticky substances. In other words, deinked pulp having a high b value and containing a lesser of an amount of sticky substances can be obtained only by using the compound which meets the above-mentioned requirements.

In the present invention, the method of adding ethylene oxide and propylene oxide is not specifically limited. The addition reaction may be carried out under conditions which are usually employed when alkylene oxides are added to a compound containing an active hydrogen. Thus, t he addition reaction involves the steps of charging a natural fat or oil (triglyceride) or a reaction product prepared by reacting a natural fat or oil, with glycerin, and a hexahydric alcohol, adding a catalytic amount of alkaline substance to the mixture, and reacting the glyceride mixture with ethylene oxide and propylene oxide at about 100°–200° C. for several hours under a pressure of 1-3 kg/cm²G.

The deinking agent of the present invention may be used in combination with any known deinking agent such as high alcohol sulfates, alkylbenzenesulfonates, and/or an ethylene oxide adduct of a higher alcohol or alkylphenol. The deinking agent of the present invention may be added in portions to any or all of the waste paper breaking steps, high-consistency bleaching steps, and floatation preliminary steps. It is added preferably in an amount of 0.03 to 1.0 wt% of the amount of waste paper.

EXAMPLES

The invention will be described in more detail with reference to the following manufacturing examples and working examples, which are not intended to restrict the scope of the invention.

MANUFACTURING EXAMPLE 1

In a 1.5-liter autoclave were placed 223.5 g of beef tallow, 13.3 of sorbitol, and 2.2 g of 100% KOH. The contents were heated to 130° C. with stirring at about 600 rpm. To the mixture was added 761.0 g of a mixture composed of ethylene oxide and propylene oxide in a molar ratio of 2:1. The addition reaction was carried out at 130°–140° C. under a pressure of 1–3 kg/cm²G. After completion of the addition reaction, the reaction product was cooled to 75° C. and neutralized to pH 6 with acetic acid. The yield of the reaction product (No. 1 in Table 1) was 99%.

MANUFACTURING EXAMPLE 2

In a 1.5-liter autoclave were placed 160.4 g of coconut oil, 3.4 g of sorbitol, and 1.6 g of 100% KOH. The contents were heated to 155° C. with stirring at about 600 rpm. To the mixture was slowly added 493.6 g of ethylene oxide. After the completion of the addition reaction of ethylene oxide, the reaction system was cooled to 120°–130° C., and 357.8 g of propylene oxide was added under a pressure of 1–3 kg/cm²G. The reaction product was cooled to 80° C. and neutralized to pH 6 with acetic acid. The yield of the reaction product (No. 11 in Table 2) was 98%.

EXAMPLE 1

Various deinking agents as shown in Table 1 were evaluated in the following manner. Waste paper composed of 50 wt% of newspaper and 50 wt% of magazine was cut into small pieces (2×5 cm), and a certain amount of cut waste paper was placed in a desk-top breaker. To the breaker was added water, 0.8% of sodium hydroxide, 2.5% of sodium silicate No. 3, 2.8% of 30% hydrogen peroxide, and 0.2% of the deinking agent shown in Table 1. (The percentage is based on the amount of waste paper.) Breaking was carried out in a 5% pulp concentration at 45° C. for 20 minutes, followed by aging at 45° C. for 60 minutes. After dilution with water to a pulp concentration of 1.0%, floatation was carried out at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance. The more the foamy liquid, the lower the yield and the poorer the froth handling during the water treatment.

The b value means the b value in the Lab color space of Hunter color difference. It has a relationship with the tristimulus values XYZ as represented by the following formula.

$$b = 7.0(Y - 0.847Z)/Y$$

It is noted that the b value is a function of Y and Z, and positive b values indicate a yellowish tone and negative b values indicates a bluish tone.

Table 1 shows the ratio of the hexahydric alcohol/the glycerin in each deinking agent and the performance of each deinking agent.

TABLE 1

MOLAR RATIO OF HEXAHYDRIC ALCOHOL/GLYCERIN AND DEINKING PERFORMANCE

| EX-AM-PLE NO. | HEXA-HYDRIC ALCO-HOL | NAT-URAL FAT OR OIL | MOLAR RATIO OF HEXAHYDRIC ALCOHOL/ GLYCERIN | OHV | ALKYLENE OXIDE | | | DEINKED PULP | | FOAMY LIQUID (ml) |
|---|---|---|---|---|---|---|---|---|---|---|
| | | | | | COM-POUND* | EO/PO MOLAR RATIO | NUMBER OF MOLES OF EO | B VALUE % | NUMBER OF STICKY OBJECTS | |
| 1 | sorbitol | beef tallow | 0.20/1 | 75 | EO/PO (random) | 2.0 | 40 | 9.78 | 3 | 310 |
| 2 | sorbitol | fish oil | 0.18/1 | 66 | EO/PO (random) | 2.2 | 120 | 9.79 | 4 | 280 |
| 3 | sorbitol | coconut oil | 0.48/1 | 218 | EO/PO (block) | 1.8 | 34 | 9.32 | 5 | 280 |
| (4) | sorbitol | beef tallow | 0.7/1 | 239 | EO/PO (random) | 2.0 | 40 | 9.40 | 12 | 245 |
| (5) | sorbitol | beef tallow | 0.04/1 | 10 | EO/PO (random) | 2.0 | 40 | 9.21 | 11 | 85 |
| (6) | sorbitol | fish oil mono-glyceride | 0.2/1 | 485 | EO/PO (random) | 2.0 | 40 | 9.16 | 12 | 380 |
| (7) | polyoxyethylene (14 mol) polyoxypropylene (7 mol) lauryl ether | | | | | | | 7.20 | 16 | 745 |
| (8) | polyoxyethylene (14 mole) nonylphenol ether | | | | | | | 7.15 | 17 | 680 |
| (9) | potassium dodecylbenzenesulfonate | | | | | | | 7.28 | 19 | 795 |
| (10) | sodium oleate | | | | | | | 8.05 | 18 | 115 |

*EO: ethylene oxide. PO: propylene oxide; Parenthesized number indicates Comparative Examples.

EXAMPLE 2

Various deinking agents as shown in Table 2 were evaluated in the following manner. Waster paper from a magazine was cut into small pieces (2×5 cm), and a certain amount of cut waste paper was placed in a high-consistency pulper. To the pulper was added water, 0.5% of sodium hydroxide, 1.5% of sodium silicate No. 3, 1.0% of 30% hydrogen peroxide, and 0.05% of the deinking agent shown in Table 2. (The percentage is based on the amount of waste paper.) Breaking was carried out in a 15% pulp concentration at 45° C. for 20 minutes. The pulp slurry was diluted with water to a pulp concentration of 4.0%, and further diluted with water to a pulp concentration of 1.0%. The pulp slurry was subjected to floatation at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance.

Table 2 shows the molar ratio of ethylene oxide and propylene oxide in each deinking agent and the performance of each deinking agent.

TABLE 2

MOLAR RATIO OF ETHYLENE OXIDE/PROPYLENE OXIDE AND DEINKING PERFORMANCE

| EX-AM-PLE NO. | HEXA-HYDRIC ALCO-HOL | NAT-URAL FAT OR OIL | MOLAR RATIO OF HEXAHYDRIC ALCOHOL/ GLYCERIN | OHV | ALKYLENE OXIDE | | | DEINKED PULP | | FOAMY LIQUID (ml) |
|---|---|---|---|---|---|---|---|---|---|---|
| | | | | | COM-POUND* | EO/PO MOLAR RATIO | NUMBER OF MOLES OF EO | B VALUE % | NUMBER OF STICKY OBJECTS | |
| 11 | sorbitol | coconut oil | 0.1/1 | 50 | EO/PO (block) | 1.8 | 60 | 7.45 | 5 | 210 |
| 12 | tetra-glycerin | coconut oil | 0.25/1 | 19 | EO/PO (random) | 2.0 | 220 | 7.42 | 3 | 280 |
| (13) | sorbitol | coconut oil | 0.1/1 | 50 | EO/PO (block) | 2.3 | 60 | 7.00 | 15 | 285 |
| (14) | sorbitol | coconut oil | 0.1/1 | 50 | EO/PO (block) | 1.7 | 60 | 7.02 | 14 | 280 |
| (15) | tetra-glycerin | coconut oil | 0.25/1 | 19 | EO/PO (random) | 2.3 | 220 | 6.90 | 16 | 295 |
| (16) | tetra-glycerin | coconut oil | 0.25/1 | 19 | EO/PO (random) | 1.75 | 220 | 6.93 | 18 | 300 |

*EO: ethylene oxide. PO: propylene oxide; Parenthesized number indicates Comparative Examples.

EXAMPLE 3

Various deinking agents as shown in Table 3 were evaluated in the following manner. Waste paper from a magazine was cut into small pieces (2×5 cm), and a certain amount of cut waste paper was placed in a low-consistency pulper. To the pulper were added water, 0.5% of sodium hydroxide, 1.0% of sodium silicate No. 3, 0.8% of 30% hydrogen peroxide, and 0.06% of the deinking agent shown in Table 3. (The percentage is based on the amount of waste paper.) Breaking was carried out in a 4% pulp concentration at 40° C. for 15 minutes. The pulp slurry was diluted with water to a pulp concentration of 1.0%. The pulp slurry was subjected to floatation at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance.

Table 3 shows the number of moles of ethylene oxide added (based on 1 mol of glycerin) in each deinking agent and the performance of each deinking agent.

TABLE 3
NUMBER OF MOLES OF ETHYLENE OXIDE ADDED AND DEINKING PERFORMANCE

| EXAMPLE NO. | HEXAHYDRIC ALCOHOL | NATURAL FAT OR OIL | MOLAR RATIO OF HEXAHYDRIC ALCOHOL/GLYCERIN | OHV | ALKYLENE OXIDE COMPOUND* | EO/PO MOLAR RATIO | NUMBER OF MOLES OF EO | DEINKED PULP B VALUE % | NUMBER OF STICKY OBJECTS | FOAMY LIQUID (ml) |
|---|---|---|---|---|---|---|---|---|---|---|
| 17 | tetraglycerin | Fish oil | 0.4/1 | 22 | EO/PO (random) | 1.95 | 150 | 7.06 | 5 | 410 |
| 18 | sorbitol | Bone oil | 0.15/1 | 57 | EO/PO (block) | 2.1 | 100 | 7.28 | 4 | 435 |
| (19) | tetraglycerin | Fish oil | 0.4/1 | 22 | EO/PO (random) | 1.95 | 25 | 6.68 | 12 | 405 |
| (20) | tetraglycerin | Fish oil | 0.4/1 | 22 | EO/PO (random) | 1.95 | 320 | 6.41 | 18 | 495 |
| (21) | sorbitol | Bone oil | 0.15/1 | 57 | EO/PO (block) | 2.1 | 28 | 6.72 | 13 | 410 |
| (22) | sorbitol | Bone oil | 0.15/1 | 57 | EO/PO (block) | 2.1 | 336 | 6.46 | 17 | 490 |

*EO: ethylene oxide. PO: propylene oxide; Parenthesized number indicates Comparative Examples.

EXAMPLE 4

Various deinking agents as shown in Table 4 were evaluated in the following manner. Waste paper composed of 50 wt% of newspaper and 50 wt% of magazine was cut into small pieces (2×5 cm), and a certain amount of cut waste paper was placed in a desk-top breaker. To the breaker were added water, 0.8% of sodium hydroxide, 2.0% of sodium silicate No. 3, 1.5% of 30% hydrogen peroxide, and 0.5% of the deinking agent shown in Table 4. (The percentage is based on the amount of waste paper.) Breaking was carried out in a 5% pulp concentration at 50° C. for 15 minutes, followed by aging at 50° C. for 2 hours. After dilution with water to a pulp concentration of 1.0%, floatation was carried out at 30° C. for 10 minutes until the pulp slurry was concentrated to 6%. The pulp slurry was diluted with water to 1% and then made into a pulp sheet by means of a TAPPI standard sheet machine.

The thus obtained pulp sheet was tested for b value by the aid of a color difference meter and also for the number of sticky objects by the aid of an image analyzer (×40). The amount of foamy liquid (required to form the foam layer) which was generated during floatation was measured as a measure of foaming performance.

Table 4 shows the sequence of adding alkylene oxides to glycerides in each deinking agent and the performance of each deinking agent.

Having thus described the invention, it is to be noted that the same can be modified without departing from the spirit and scope thereof.

What is claimed is:

1. A deinking agent which comprises a reaction product obtained by:
   (a) reacting (i) a natural oil or a natural fat or a reaction product of a natural oil and a fat having a glycerine moiety with (ii) a hexahydric alcohol selected from the group consisting of galactitol, talitol, mannitol, sorbitol and tetraglycerin, wherein the molar ratio of said hexahydric alcohol and glycerine moiety in said natural oil and fat is in the range of between 0.05/1–0.48/1, to obtain an ester mixture having a hydroxyl group value (OHV) of 18–220; and
   (b) reacting said ester mixture with ethylene oxide and propylene oxide wherein the molar ratio of ethylene oxide to propylene oxide is in the range of between 1.8 and 2.2, and the average mole number of added ethylene oxide is in the range of between 30 and 300, based on the mole number of glycerin present.

2. The deinking agent according to claim 1 wherein said ester mixture is reacted randomly with ethylene oxide and propylene oxide.

3. The deinking agent according to claim 1 wherein said reaction product of a natural oil or a fat with glycerine is a monoglyceride or diglyceride.

4. A method of deinking waste paper which comprises:
   contacting waste paper with an effective deinking amount of the deinking agent according to claim 1.

5. The method according to claim 4 wherein said effective deinking amount of said deinking agent is from 0.03 to 1.0% by weight based on the amount of said waste paper.

* * * * *

TABLE 4
SEQUENCE OF ADDITION OF ALKYLENE OXIDES AND DEINKING PERFORMANCE

| EXAMPLE NO. | HEXAHYDRIC ALCOHOL | NATURAL FAT OR OIL | MOLAR RATIO OF HEXAHYDRIC ALCOHOL/GLYCERIN | OHV | ALKYLENE OXIDE COMPOUND* | EO/PO MOLAR RATIO | NUMBER OF MOLES OF EO | DEINKED PULP B VALUE % | NUMBER OF STICKY OBJECTS | FOAMY LIQUID (ml) |
|---|---|---|---|---|---|---|---|---|---|---|
| 23 | tetraglycerin | Palm oil | 0.34/1 | 20 | EO/PO (random) | 1.9 | 80 | 9.80 | 3 | 415 |
| 24 | sorbitol | Beef tallow | 0.22/1 | 82 | EO/PO (random) | 2.2 | 32 | 9.82 | 4 | 380 |
| 25 | tetraglycerin | Palm oil | 0.34/1 | 20 | EO/PO (block) | 1.9 | 80 | 9.60 | 6 | 460 |
| 26 | sorbitol | Beef tallow | 0.224/1 | 82 | EO/PO (block) | 2.2 | 32 | 9.61 | 6 | 415 |

*EO: ethylene oxide. PO: propylene oxide.